Sept. 6, 1927.  
G. V. KARLSON  
1,641,170  
LIGHT OPERATED CONTROLLING APPARATUS  
Filed April 15, 1926

Inventor  
Gustav V. Karlson  
by his Attorney  
John S. Nolan

Patented Sept. 6, 1927.

1,641,170

UNITED STATES PATENT OFFICE.

GUSTAV V. KARLSON, OF ELIZABETH, NEW JERSEY.

LIGHT-OPERATED-CONTROLLING APPARATUS.

Application filed April 15, 1926. Serial No. 102,352.

This invention relates to that class of apparatus wherein expansible and contractible thermal elements are operable under the influence of light and darkness to control an electric switch or valve, whereby a lamp, for example, is ignited in darkness or cloudy weather and is extinguished in the daylight.

Heretofore such apparatus included a plurality of relatively expansible cylindrical elements which were subjected to unequal temperatures by the influence of light rays upon one or more of the elements in such a manner as to effect unequal expansion of the elements, together with means whereby the differential of expansions was transmitted to a switch or valve. These prior devices were cumbersome, complicated and expensive; they possessed many moving parts, and their operation was uncertain.

The object of my invention is to provide a controlling apparatus which positively and quickly responds to changes in temperature by the influence of light and darkness, and possesses the merits of simplicity, cheapness, compactness and durability.

To this end, the invention comprises a suitable casing containing two thermal elements in the form of counterpart volutes or spirals which are co-operatively combined with a central arbor so as to keep it in equipoise, and means whereby one of the elements can be effectively exposed to the influence of light rays in the daytime while the other element is shielded therefrom, thus effecting expansion of the exposed element in a manner partially to rotate the arbor and operate an electric contact device or other instrumentality.

The invention also comprises novel features of construction and combinations of parts which will be hereinafter described; the scope of the invention being defined in the appended claims.

In the drawings—

Figure 1:
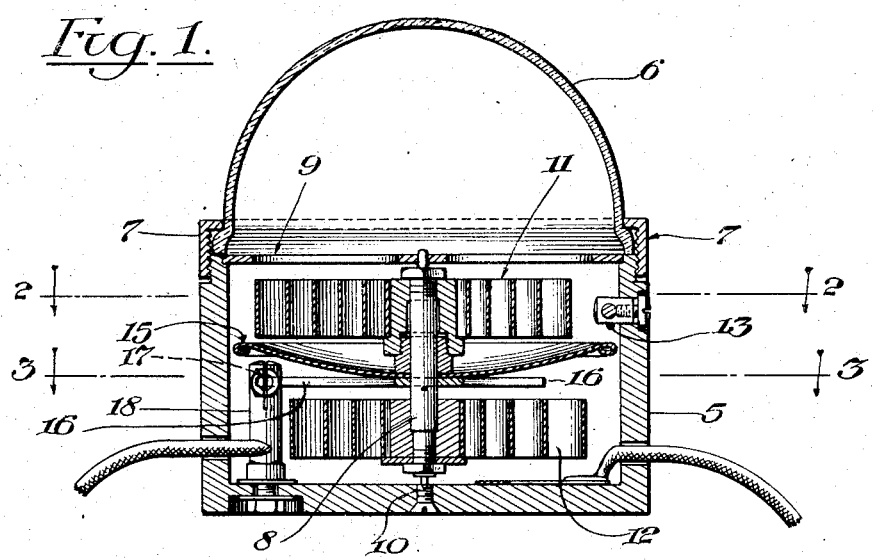
Figure 1 is a vertical section of an apparatus embodying the preferred form of my invention.
Figure 2:
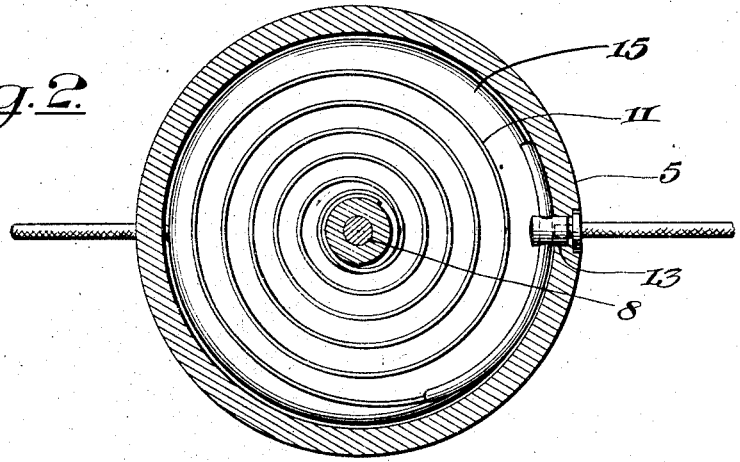
Fig. 2 is a horizontal section of the apparatus, as on the line 2—2 of Fig. 1.
Figure 3:
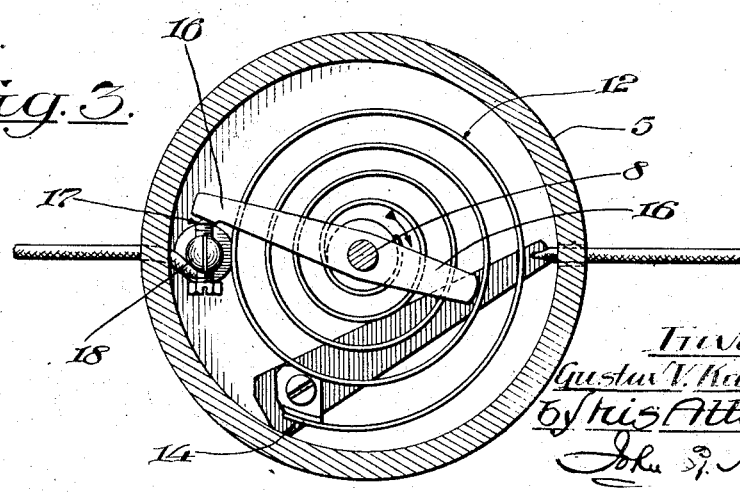
Fig. 3 is a similar section, as on the line 3—3 of Fig. 1.

Referring to the drawings, 5 designates a suitable casing, preferably cylindrical, which is open at the top and is provided with a transparent glass dome 6 detachably secured to the casing by means, for example, of a flanged screw ring 7. Mounted centrally within the casing is an arbor 8, which is journaled at its upper end in a spider 9 affixed to the casing. Fixed to the arbor are the inner ends of two counter-part volute thermal elements 11, 12, one being spaced above the other, and being secured to the casing as at 13 and 14 respectively. The volutes are reversely disposed so as normally to exert opposed balancing forces upon the arbor to the end that the unequal expansion of one of the elements will be transmitted to the arbor in opposition to the force of the other element. Also fixed to the arbor, in the space between the two volute thermal elements, is a light reflecting element 15 which separates the interior of the casing into two chambers for the respective thermal elements. The upper concave surface of the element 15 is bright or polished so as to reflect the radiation that falls upon it, and its underside, as well as the interior walls and bottom of the lower chamber, is black or light absorbing. The upper thermal element is also black or light absorbing so as to lose none of the heat by convection. Fast to the arbor, at a point below the reflector element is a radial arm 16, which is normally held by the counter-acting resiliency of the volutes against a contact member 17 on a suitably disposed post 18 rising from the bottom of the casing and included in an electrical circuit.

In darkness or cloudy weather the two corresponding thermal elements 11, 12, are subjected to an equable temperature and, therefore, the arbor 8 is maintained in a neutral or balanced position with the electric circuit completed. Hence a lamp or other translating device included in the circuit is energized. In the day time, however, the upper thermal element, 11, is exposed to the influence of light rays, which pass through the glass dome into the upper chamber and strike upon and are well reflected against such element, which rays, being absorbed by the thermal element 11 and converted into heat, effect the expansion of the element 11 in opposition to the normal force of the element 12 from which the light rays are excluded. Consequently the element 11 by its expansion partially turns the arbor in a manner to break the electrical contact, thus de-energizing the lamp or other electrically-actuated device which may be included in the circuit.

By the foregoing described construction it will be seen that a simple and compact apparatus is provided wherein two thermal elements are equally effected by ordinary atmospheric temperatures so as to contract and expand uniformly in the absence of light rays, and therefore the arbor is maintained normally in a contact-making position. Moreover, that a maximum differential of temperature is effected between the two thermal elements when the upper element is subjected to the influence of the light rays as previously mentioned, thus effecting a maximum differential of expansion between the two elements and ensuring the positive operation of the contact device to break the circuit.

My invention is not limited to the specific details herein disclosed, as the structure may be modified within the principle of the invention and the scope of the appended claims.

I claim—

1. In a light-operated controlling apparatus, the combination of two reversely-disposed volutes constituting thermal elements which are equally effected by atmospheric temperatures so as to contract and expand uniformily in the absence of light, and a rotatable member to which the inner ends of said elements are connected so as to maintain said member normally in equipoise, one of said elements being adapted to be exposed to the influence of light which effects unequal expansion of said element and partial rotation of said member.

2. In a light-operated controlling apparatus, the combination of two reversely-disposed volutes constituting thermal elements which are equally effected by atmospheric temperatures so as to contract and expand uniformly in the absence of light, a central arbor to which the inner ends of the said thermal elements are connected so as to maintain the arbor normally in equipoise, one of said elements being adapted to be exposed to the influence of light which effects unequal expansion of said element, and a control member on the arbor actuated by the unequal expansion of the exposed element.

3. In a light-operated controlling apparatus, the combination of a casing having two chambers whereof one is adapted to be exposed to light rays, a central arbor rotatably mounted in said casing, two counteracting thermal elements in the form of volutes or spirals contained in the respective chambers and attached at their inner ends to the arbor so as to maintain the arbor normally in equipoise, and a control member operative by the unequal expansion of the thermal element under the influence of light.

4. In a light-operated controlling apparatus, the combination of a casing, a central arbor therein, a reflector separating the interior of the casing into two chambers one of which is adapted to be exposed to light rays, two counter-acting volute thermal elements contained in the respective chambers and attached at their inner or central portions to the arbor so as to maintain the arbor normally in equipoise, and a control member operative by the unequal expansion of the thermal elements under the influence of light.

5. In a light-operated controlling apparatus, the combination of two counter-acting volute thermal elements, a central arbor to which the inner ends of the said thermal elements are connected so as to maintain the arbor normally in equipoise, one of said elements being adapted to be exposed to the influence of light which effects unequal expansion of said element, an electrical circuit in which co-operating contact devices are included, one of said contact devices comprising an arm affixed to the arbor and actuated by the unequal expansion of the exposed element so as to break the circuit.

6. In a light-operated controlling apparatus, the combination of a casing having a transparent dome, a central arbor mounted to rotate in the casing, a reflector separating the interior of the casing into two chambers arranged one above the other, two counteracting volute thermal elements contained in the respective chambers and attached at their inner or central portions to the arbor so as to maintain the arbor normally in equipoise, and a contact making and breaking member on said arbor operative by the unequal expansion of the upper element under the influence of light.

Signed at New York in the county and State of New York this 6th day of April, A. D. 1926.

GUSTAV V. KARLSON.